United States Patent [19]

Blake

[11] Patent Number: 4,500,814
[45] Date of Patent: Feb. 19, 1985

[54] LIGHTING CIRCUIT CONTROL APPARATUS

[76] Inventor: Frederick H. Blake, 226 W. Edith Ave., No. 28, Los Altos, Calif. 94022

[21] Appl. No.: 505,986

[22] Filed: Jun. 20, 1983

[51] Int. Cl.³ .............................................. H05B 37/00
[52] U.S. Cl. .................................. 315/323; 315/308; 315/360
[58] Field of Search .................. 315/323, 308, 360

[56] References Cited

U.S. PATENT DOCUMENTS

| | | | |
|---|---|---|---|
| 3,895,265 | 7/1975 | Watrous | 315/323 |
| 4,225,808 | 9/1980 | Saraceni | 315/366 |
| 4,277,727 | 7/1981 | LeVert | 315/155 |
| 4,368,408 | 1/1983 | Marcus | 315/360 |

Primary Examiner—Harold Dixon
Attorney, Agent, or Firm—Brown, Martin & Haller

[57] ABSTRACT

A light circuit control apparatus for controlling the illumination of a predetermined area is described comprising a photocell coupled to a first comparator circuit for generating a "light-on" signal when the ambient light in the predetermined area decreases to a first predetermined intensity and a second comparator for generating a "light-off" signal when the ambient light in the predetermined area increases to a predetermined intensity, and logic circuits including flip-flops for turning on and turning off a plurality of lighting circuits in a predetermined sequence in response to the "light-on" and "light-off" signals generated by the comparator.

11 Claims, 3 Drawing Figures

4,500,814

LIGHTING CIRCUIT CONTROL APPARATUS

FIELD OF THE INVENTION

The present invention relates to apparatus for controlling a plurality of lighting circuits in general and in particular to an apparatus for automatically turning on and turning off a plurality of lighting circuits in a predetermined sequence as a function of changes in the intensity of ambient light in a predetermined area illuminated by the lighting circuits.

BACKGROUND OF THE INVENTION

The interior of large commercial buildings, such as supermarkets, warehouses, department stores, office buildings and the like are often naturally illuminated during some part of a day by sunlight. During periods of darkness or reduced sunlight, artificial light is usually provided.

To take advantage of the sunlight, the artificial light is typically provided using a plurality of lighting circuits which can be individually controlled. As the intensity of the sunlight changes in a predetermined area in the interior of the building, the lighting circuits used to illuminate the area are turned on and off as needed. By turning the lighting circuits on and off as needed, both money and energy are conserved.

Heretofore, the turning on and off of individual lighting circuits in the interior of a building wholly or partially illuminated by sunlight has been done manually or with the use of photocells separately or in combination with a settable timing apparatus, such as clock-driven switches. In large buildings such methods and apparatus have frequently proven to be time-consuming and costly. For example, in the case of manually controlled systems, during cloudy or stormy days, there is a tendency for maintenance personnel to turn the lights on and leave them on even though the ambient natural light intensity in the area artificially illuminated may increase to adequate natural light levels during periods of the day. In the case of automatic systems, there is frequently little inclination to readjust clock-driven switches as the days get longer and shorter throughout the year. Moreover, even when using clock-driven switches, there is still a need for a manual or some type of photocell-controlled switching apparatus to turn the lights on and off during unexpected periods of natural darkness and light.

In a conventional lighting system using a photo-cell, to turn a light on and off, it has been found that, unless the photocell is shielded from the artificial light which it controls, or some other precaution is taken, the turning on of a light will activate the photocell to turn the light off. Thus, it has been the practice to place the photocell in a position wherein it only responds to natural light intensity and is not affected by the light which it controls. This practice, however, does not provide adequate lighting control in areas in which the ambient light intensity changes independently of exterior or natural light intensity. For example, in a warehouse, the placing of boxes or the like in front of a window could significantly reduce interior light intensity without affecting the intensity of the light sensed by an exterior photocell.

SUMMARY OF THE INVENTION

For the foregoing reasons, a principal object of the present invention is an apparatus for controlling a plurality of lighting circuits which is responsive to changes in the intensity of the light illuminating a particular area to control the lighting circuits illuminating that area.

Another object of the present invention is a lighting control apparatus as described above which turns on and turns off a plurality of lighting circuits in a predetermined sequence as a function of the intensity of the ambient light in the area illuminated by the lighting circuits.

Another object of the present invention as described above is a lighting apparatus for controlling a plurality of lighting circuits which utilizes a single photocell responsive to the light intensity in the area being lighted by the lighting circuits.

Still another object of the present invention is an apparatus for controlling a plurality of lighting circuits which turns on another one of the plurality of lighting circuits each time the intensity of the ambient light in the area being illuminated by the lighting circuits decreases to a predetermined light level and turns off another one of the plurality of lighting circuits each time the intensity of the light in the predetermined area illuminated by the lighting circuits increases to a predetermined light level.

In accordance with the above objects of the present invention, there is provided a bistable flip-flop associated with each of the plurality of lighting circuits to be controlled. In a first embodiment, the flip-flops are set and reset in a predetermined sequence in response to the output of a photocell using a plurality of AND gates, inverters and delay circuits. In a second embodiment, the flip-flops are set and reset in a predetermined sequence in response to the output of a photocell using a plurality of AND gates and delay circuits. In this embodiment, the delay circuits, coupled to the set input of certain of the flip-flops, is a delay circuit known as a delayed-on instant reset circuit. Delayed-on instant reset circuits and the delay circuits of the previous embodiment are employed for preventing the turning on of more than one light circuit at a time.

In another embodiment of the present invention the flip-flops are set and reset in response to the output of a photocell using delayed-on instant reset circuits which are connected to the set input of certain ones of the flip-flops. In this embodiment AND gates are not used and the delayed-on instant reset circuits are connected to the flip-flops in such a manner as to delay the turning on of more than one particular light circuit for a predetermined period after a response from the photocell signals that the light circuit should be turned on.

BRIEF DESCRIPTION OF THE DRAWING

The above and other objects, features and advantages of the present invention will become apparent from the following detailed description of the accompanying drawing in which.

DETAILED DESCRIPTION OF THE INVENTION

Figure 1:
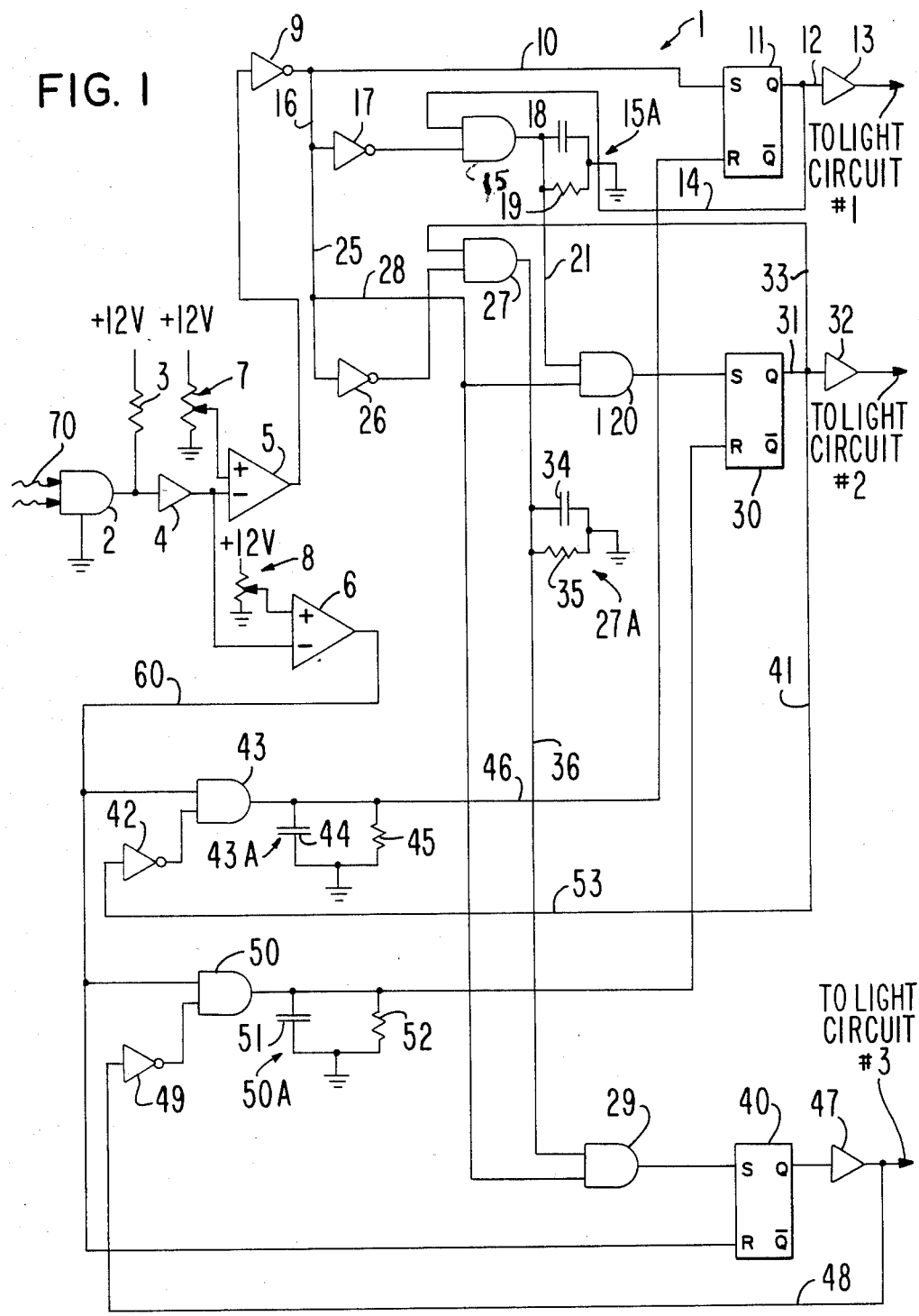
FIG. 1 is a block diagram of one embodiment of the present invention.

Referring to FIG. 1, there is provided, in accordance with the present invention, a light control apparatus for controlling a plurality of lighting circuits designated generally as 1. In control apparatus 1 there is provided a photocell 2. The photocell 2 is powered by a 12-volt supply through a resistor 3. The output of the photocell 2 is coupled to the input of a buffer 4. The output of the buffer 4 is coupled to a first input of a comparator circuit 5 and a first input of a comparator circuit 6. A second input of a comparator circuit 5 is coupled to a voltage divider 7. A second input of the comparator circuit 6 is coupled to a voltage divider 8. The output of comparator circuit 5 is coupled to an inverter 9 and, by means of a line 10, to the set input of the flip-flop 11. The Q output of the flip-flop 11 is coupled, by means of a line 12, through an amplifier 13, to a first lighting circuit No. 1 and, by means of a line 14, to one input of an AND gate 15. The second input of the AND gate 15 is coupled to the output of inverter 9 by means of a line 16 through an inverter 17. The output of the AND gate 15 is coupled to GROUND through a delay circuit 15A comprising a capacitor 18 coupled in parallel to a resistor 19 and to an input of an AND gate 20 by means of a line 21.

The output of the inverter 9 is also coupled, by means of a line 25, through an inverter 26, to one input of an AND gate 27 and, by means of a line 28, to a second input of the AND gate 20 and to an input of an AND gate 29. The output of the AND gate 20 is coupled to the set input of a flip-flop 30. The Q output of the flip-flop 30 is coupled, by means of a line 31, through an amplifier 32, to a light circuit No. 2 and by means of a line 33, to a second input of the AND gate 27. The output of the AND gate 27 is coupled to GROUND through a delay circuit 27A comprising a capacitor 34 coupled in parallel with a resistor 35, and, by means of a line 36, to a second input of the AND gate 29. The output of the AND gate 29 is coupled to the set input of a flip-flop 40. The Q output of the flip-flop 30 is coupled, by means of a line 41, through an inverter 42 to an input of an AND gate 43. The output of the AND gate 43 is coupled to GROUND through a delay circuit 43A comprising a capacitor 44 coupled in parallel to a resistor 45 and, by means of a line 46, to the reset input of the flip-flop 11.

The Q output of the flip-flop 40 is coupled, through an amplifier 47, to a light circuit No. 3, and by means of a line 48, through an inverter 49, to an input of an AND gate 50. The output of the AND gate 50 is coupled to GROUND through a delay circuit 50A comprising a capacitor 51 coupled in parallel to a resistor 52, and, by means of a line 53, to the reset input of the flip-flop 30.

The output of the comparator circuit 6 is coupled, by means of a line 60, to a second input of the AND gate 43, a second input of the AND gate 50 and to the reset input of the flip-flop 40.

In practice, the voltage divider 7 is set to provide an output from the comparator circuit 5 when the light, shown by wavy arrows 70, impinging on photocell 2, has an intensity exceeding 30 foot-candles, such that, when the light 70 has an intensity which is less than 30 foot-candles, the output of inverter 9 goes high.

The voltage divider circuit 8, coupled to the input of comparator 6, is adjusted so that, when the intensity of the light 70, impinging on the photocell 2, has an intensity greater than 42 foot-candles, the output of comparator circuit 6 goes high. The setting of the voltage divider circuit 7 and 8 depends on the intensity of the lights comprising each of the lighting circuits No. 1, No. 2 and No. 3. In the example described, it is assumed that the light intensity from each of the lighting circuits No. 1, No. 2 and No. 3 does not exceed 10 foot-candles.

In operation, as the light intensity of the area illuminated by the lighting circuits No. 1, No. 2 and No. 3 decreases to an intensity of 30 foot-candles, a low on the output of comparator 5 produces a high on the output of inverter 9 ("light-on" signal) A high on the output of inverter 9 sets the flip-flop 11, which turns on lighting circuit No. 1. Setting flip-flop 11 also enables AND gate 15. As soon as lighting circuit No. 1 turns on, the intensity of the light sensed by photocell 2 is increased by at least 10 foot-candles above the 30 foot candle threshold of comparator circuit 5. As the output of comparator circuit 5 goes high, the output of inverter 9 goes low. A low on the output of inverter 9 produces a high on the output of inverter 17, which, with the output of flip-flop 11, produces a high on the output of AND gate 15, enabling AND gate 20. At this time, however, a low on the remaining input to AND gate 20 maintains a low on the output of AND gate 20 until the intensity of the light sensed by photocell 2 decreases once again to less than 30 foot-candles.

Once the intensity of the light illuminating photocell 2 reduces to 30 foot-candles, the output of comparator 5 again goes low, producing a high on the output of inverter 9. A high on the output of inverter 9, together with a high on the output of AND gate 15, produces a high on the output of AND gate 20, setting flip-flop 30 and turning on light circuit No. 2. The setting of flip-flop 30 enables AND gate 27. However, the turning on of the light circuit 2 changes the output of inverter 9 to a low, thus preventing the setting of flip-flop 40 until the light intensity again decreases to 30 foot-candles. Thus it can be seen from the foregoing description, each of the lighting circuits 1, 2 and 3 are turned on in sequence, each time the intensity of the light sensed by the photocell 2 in the area illuminated by the lighting circuits decreases to 30 foot-candles.

Once each of the lighting circuits 1, 2 and 3 are illuminated, they will remain illuminated until the intensity of the light in the area illuminated by the lighting circuits Nos. 1, 2 and 3 increases, as by sunlight, to 42 foot-candles.

When the light intensity in the area illuminated by the lighting circuits Nos. 1, 2 and 3 increases to 42 foot-candles, the output of comparator 6 goes high ("lightoff" signal), resetting flip-flop 40 and turning off lighting circuit No. 3. With lighting circuit No. 3 turned off, the intensity of the light illuminating photocell 2 decreases to below 42 foot-candles, forcing the output of comparator 6 to go low, disabling AND gates 43 and 50.

When the intensity of the light in the area lighted by lighting circuits Nos. 1, 2 and 3 once again increases to 42 foot-candles, the output of comparator 6 goes high. The high output from comparator 6, together with the high output from inverter 49, causes the output of AND gate 50 to go high, resetting flip-flop 30, turning off lighting circuit No. 2. The turning off of lighting circuit No. 2 forces the output of comparator 6 to go low, disabling AND gate 43. AND gate 43 remains disabled until, once again, the intensity of the light sensed by photocell 2 increases to 42 foot-candles, at which time the output of comparator 6 goes high. When the output of comparator 6 goes high, the output of AND gate 43 goes high, resetting flip-flop 11, turning off lighting circuit No. 1.

The delay circuits 15A, 27A, 43A and 50A are provided to compensate for a potential "race" condition which may exist if inverters 17, 26, 42 and 49 have an inherent delay which is longer than the time it takes for the flip-flop associated therewith to change state. For example, referring to the circuit controlling the lighting of light circuit No. 1, the output of the inverter 17 is high when the output of inverter 9 is low and the lighting circuit No. 1 is off. When the output of inverter 9 goes high, flip-flop 11 is set, turning on the lighting circuit No. 1. When flip-flop 11 is set, AND gate 15 receives a high output from the output of flip-flop 11. If, due to an inherent delay, the output of inverter 17 has not yet changed state from a high to a low by the time the Q output of flip-flop 11 goes high, the output of AND gate 15 would go high setting flip-flop 30 through AND gate 20. However, by means of the capacitor 18 and resistor 19 coupled to the output of AND gate 15, the output of the AND gate 15 is prevented from changing state until after the output of the inverter 17 has changed state, disabling the AND gate 15.

From the foregoing description of the circuit of FIG. 1, it can be seen that, in accordance with the present invention, the apparatus of FIG. 1 turns on one of the lighting circuits 1, 2 and 3 in a predetermined sequence each time the intensity of the light sensed by photocell 2 decreases to 30 foot-candles and turns off one of the lighting circuits 1, 2 and 3 in a predetermined sequence each time the intensity of the light sensed by photocell 2 increases to 42 foot-candles.

Figure 2:
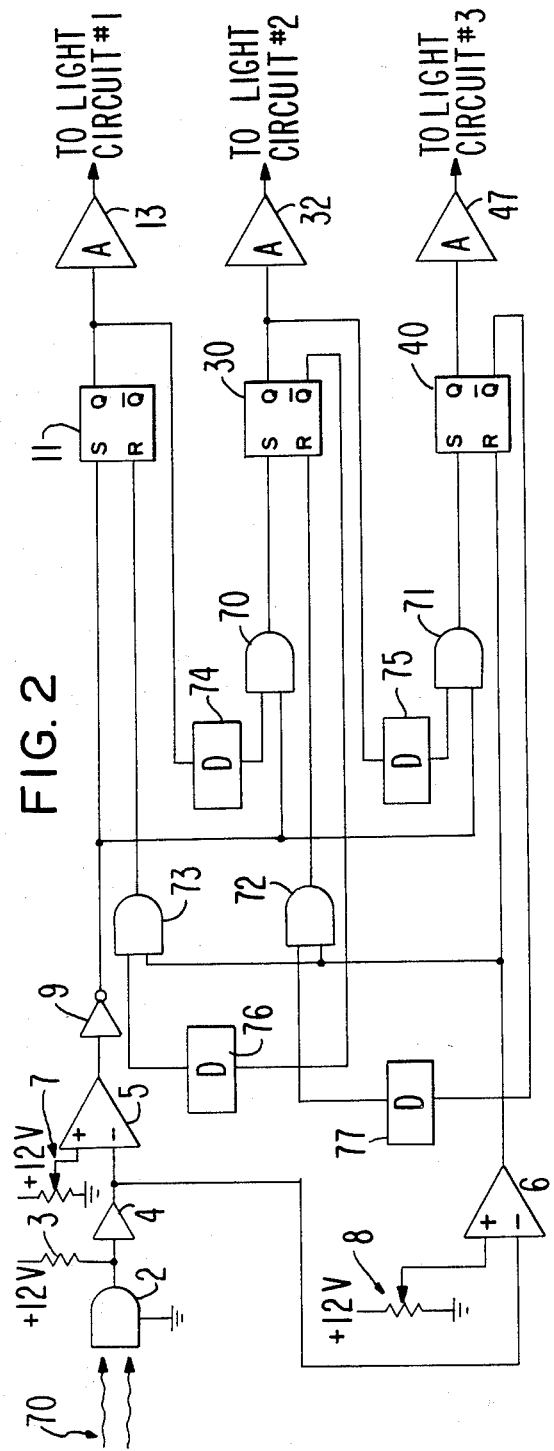
FIG. 2 is a block diagram of another embodiment of the present invention.

Referring to FIG. 2, in an alternative embodiment of the present invention, the output of inverter 9 is coupled to the set input of the flip-flop 11 and to the set inputs of the flip-flops 30 and 40 through a pair of AND gates 70 and 71, respectively. The output of the comparator 6 is coupled to the reset input of the flipflop 40 and to the reset inputs of the flip-flops 30 and 11, through a pair of AND gates 72 and 73, respectively. The Q output of the flip-flop 11 is coupled to the AND gate 70 through a delayed-on instant reset circuit 74. The Q output of the flip-flop 30 is coupled to the AND gate 71 through a delayed-on instant reset circuit 75. Each of the delay circuits 74 and 75 provides a delay which is slightly longer than the time it takes for the lighting circuits No. 1 and No. 2 to turn on. For example if the lighting circuits No. 1 and No. 2 take 10 minutes to turn on, a typical delay period for the delay circuits 74 and 75 would be 11 minutes. The delay circuits 74 and 75 are conventional circuits, each having an output which does not change state if the input thereof returns to its initial state before the delay period expires.

Coupling the $\overline{Q}$ output of the flip-flop 30 and the AND gate 73, there is provided a delay circuit 76. Coupling the $\overline{Q}$ output of the flip-flop 40 and the AND gate 72, there is provided a delay circuit 77. Delay circuits 76 and 77 prevent the turning off of more than one lighting circuit at a time.

In operation, when the lighting circuits 1, 2 and 3 are off, a decrease in the light intensity sensed by the photocell 2 to 30 foot-candles causes the output of inverter 9 to go high, setting flip-flop 11, turning on lighting circuit No. 1 and enabling AND gates 70 and 71. As soon as lighting circuit No. 1 turns on, the intensity of the light sensed by photocell 2 increases to above 30 foot-candles, causing the output of the inverter 9 to go low. The delayed-on instant reset circuit 74 prevents the high output from the flip-flop 11 from reaching AND gate 70 until after the output of the inverter 9 goes low.

When the intensity of the light sensed by photo-cell 2 again decreases to 30 foot-candles, the output of inverter 9 goes high, which, together with the high output from flip-flop 11, sets flip-flop 30 by means of AND gate 70, turning on lighting circuit No. 2. As described above with respect to lighting circuit No. 1, the delayed-on instant reset circuit 75 prevents the Q output of flip-flop 30 from enabling AND gate 71 until after the turning on of lighting circuit No. 2 causes the output of inverter 9 to go low.

After lighting circuit No. 3 is turned on in the manner described above with respect to the turning on of the lighting circuits No. 1 and No. 2, the lighting circuits Nos. 1, 2 and 3 will remain on until the intensity of the light sensed by photocell 2 increases to 42 foot-candles. When the light intensity sensed by photocell 2 increases to 42 foot-candles, the output of comparator circuit 6 goes high, resetting flip-flop 40. The resetting of flip-flop 40 turns off lighting circuit No. 3 and causes the $\overline{Q}$ output of flip-flop 40 to go high. The delay 77 prevents the high from reaching the AND gate 72 until after the output of the comparator 6 goes low.

When the intensity of the light sensed by photocell 2 again increases to 42 foot-candles, the output of comparator 6 again goes high, causing the output of AND gate 72 to go high, resetting flip-flop 30. The resetting of flip-flop 30 turns off lighting circuit No. 2 and causes the $\overline{Q}$ output of flip-flop 30 to go high. Delay circuit 76 prevents the high $\overline{Q}$ output of flip-flop 30 from reaching AND gate 73 until after the output of comparator circuit 6 goes low.

If the lighting circuits No. 2 and No. 3 turned off, lighting circuit No. 1 remains on until once again the intensity of the light sensed by photocell 2 increases to 42 foot-candles. When the light sensed by photocell 2 increases to 42 foot-candles, the output of comparator 6 and AND gate 73 go high, resetting flip-flop 11, turning off lighting circuit No. 1. Thus it can be seen that each time the light intensity sensed by photocell 2 decreases to 30 foot-candles, another one of the lighting circuits 1, 2 and 3 is turned on in a predetermined sequence and similarly, each time the light intensity sensed by photocell 2 increases to 42 foot-candles, another one of the lighting circuits 1, 2 and 3 is turned off in a predetermined sequence.

Figure 3:
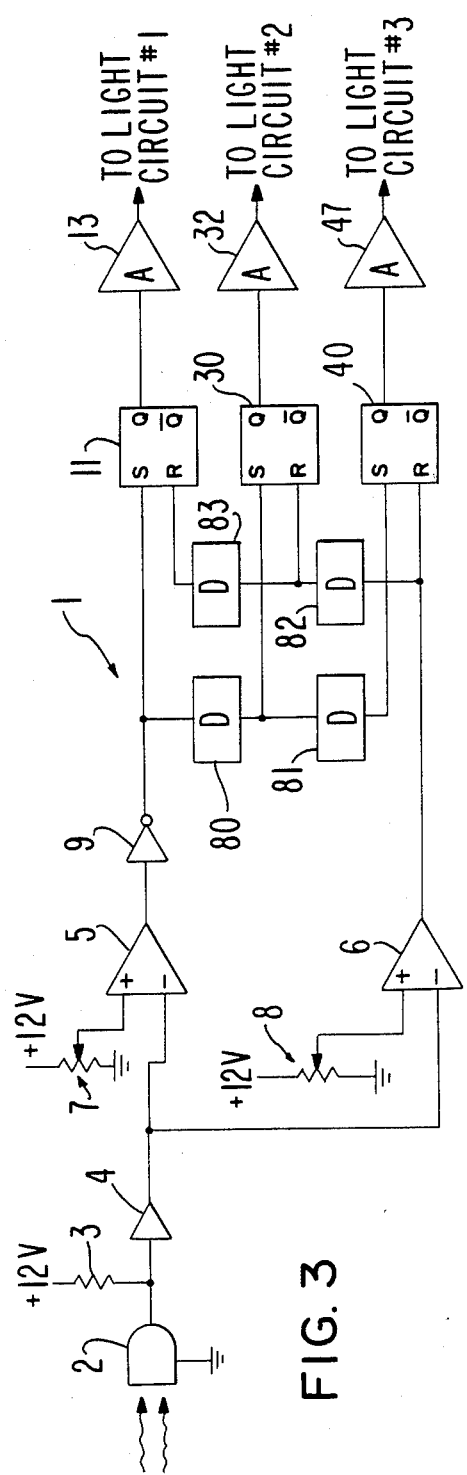
FIG. 3 is a block diagram of still another embodiment of the present invention.

Referring to FIG. 3, in another embodiment of the present invention, the output of inverter 9 is coupled to the set input of the flip-flop 11 and to the set inputs of the flip-flops 30 and 40 through a pair of delayed-on instant reset circuits 80 and 81, respectively. The output of comparator 6 is coupled to the reset input of the flip-flop 40 and to the reset inputs of the flip-flops 30 and 11, through a pair of delay circuits 82 and 83, respectively. Delay circuits 80 and 81 are settable delayed-on instant reset circuits which are set for providing a delay slightly longer than the time it takes for the lighting circuits Nos. 1 and 2 turn on. Similarly, the delay circuits 82 and 83 provide a delay slightly longer than the time it takes for the lighting circuits Nos. 2 and 3 to turn off. These delays, as described above with respect to the apparatus of FIGS. 1 and 2, are necessary to prevent turning on or turning off more than one lighting circuit at a time.

In operation, when the light intensity sensed by photocell 2 decreases to 30 foot-candles, the output of inverter 9 goes high, setting the flip-flop 11 and turning on light circuit No. 1. The delayed-on instant reset circuit 80 prevents the high output from the inverter 9 from reaching the set input of the flip-flop 30. When the lighting circuit No. 1 turns on, the intensity of the light sensed by the photocell 2 increases to above 30 foot-candles.

When the lighting intensity sensed by the photo-cell 2 decreases to 30 foot-candles, the output of inverter 9 again goes high. After the period of the delay circuit 80, the high output of the inverter 9 is applied to the set input of the flip-flop 30, turning on the lighting circuit No. 2. When the lighting circuit No. 2 turns on, the light intensity sensed by the photocell 2 increases above 30 foot-candles, causing the output of the inverter 9 to go low, resetting delay circuits 80 and 81.

When, once again, the light intensity sensed by photocell 2 decreases to 30 foot-candles, the output of inverter 9 goes high. The high output of inverter 9, after the period of delay determined by delayed-on instant reset circuits 80 and 81, sets flip-flop 40, turning on light circuit No. 3.

Light circuits Nos. 1, 2 and 3 remain on until such time as the light intensity sensed by photocell 2 increases to 42 foot-candles. When the light intensity sensed by photocell 2 increases to 42 foot-candles, the output of comparator circuit 6 goes high, resetting flip-flop 40 and turning off light circuit No. 3. The delayed-on instant reset circuits 82 and 83 prevent the resetting of flip-flops 30 and 11. When the light circuit No. 3 turns off, the output of the comparator circuit 6 goes low, resetting the delayed-on instant reset circuits 82 and 83. Thereafter, when the light intensity sensed by photocell 2 increases to 42 foot-candles, the output of comparator 6 goes high. The high output of comparator 6 is then applied, after the delay determined by delay circuit 82, to the flip-flop 30 to reset flip-flop 30 and turn off light circuit No. 2. The turning off of light circuit No. 2 decreases the light intensity sensed by photocell 2 to below 42 foot-candles, causing the output of comparator 6 to go low, resetting delay circuit 82. When the light sensed by the photocell 2 once again increases to 42 foot-candles, the output of comparator 6 goes high. The high output of comparator 6, after the delay determined by delay circuits 82 and 83 is applied to flip-flop 11, resetting flip-flop 11 and turning off light circuit No. 1.

While the lighting control apparatus of FIG. 1 is more complex than the apparatus of FIGS. 2 and 3, the apparatus of FIG. 1 does not require the use of delayed-on instant reset circuits for preventing the turning on of more than one lighting circuit at a time as is required in the apparatus of FIGS. 2 and 3.

Referring to the apparatus of FIG. 3, it may be noted that in industrial applications, using lighting circuits having relatively long starting or warm-up times, the time it takes to turn on succeeding lighting circuits each time the light intensity sensed by photocell 2 decreases to 30 foot-candles, is somewhat longer than the aggregate time it took to light the preceding lighting circuits. For example, if it takes 10 minutes to turn on lighting circuit No. 1 after the flip-flop 11 is set, it will take somewhat longer than 10 minutes to turn on lighting circuit No. 2 after the light intensity sensed by photocell 2 decreases to 30 foot-candles and the output of inverter 9 goes high. Similarly, with the apparatus of FIG. 3, it would take somewhat longer than 20 minutes to turn on lighting circuit No. 3 after the intensity of light sensed by photocell 2 decreases to 30 foot-candles and the output of inverter 9 goes high due to the delay circuits 80 and 81 being coupled between the output of inverter 9 and the set input of the flip-flop 40. In certain industrial applications, in which lighting conditions change relatively slowly, this delay may be acceptable.

While several embodiments of the present invention are described, it is contemplated that still other changes may be made to the embodiments without departing from the spirit and scope of the present invention. Accordingly, it is intended that the scope of the invention should not be limited to the embodiments described, but rather be determined by reference to the claims hereinafter provided and their equivalents.

What is claimed is:

1. A light circuit control apparatus for turning on and turning off a plurality of lighting circuits in a first and a second predetermined sequence, respectively, comprising:

control means responsive to the intensity of ambient light in an area illuminated by said lighting circuits for turning on a succeeding one of said lighting circuits in said first predetermined sequence each time the intensity of the light in said area decreases to a first predetermined intensity and for turning off a succeeding one of said lighting circuits in said second predetermined sequence each time the intensity of the light in said area increases to a second predetermined intensity.

2. An apparatus according to claim 1 wherein said control means comprises:

a bistable circuit means associated with each of said plurality of lighting circuits, said bistable circuit means being settable to a light-on and to a light-off condition for turning on and turning off, respectively, said lighting circuit associated therewith;

means responsive to the intensity of ambient light in said area illuminated by said lighting circuits for generating a "light-on" signal when said intensity decreases to said first predetermined intensity and a "light-off" signal when said intensity increases to said second predetermined intensity;

means responsive to said "light-on" signal and the setting of a first one of said bistable circuit means to its light-on condition for setting a second one of said bistable circuit means to its light-on condition; and means responsive to said "light-off" signal and the setting of a first one of said bistable circuit means to its light-off condition for setting a second one of said bistable circuit means to its light-off condition.

3. An apparatus according to claim 2 wherein said control means comprises means for preventing the turning-on and turning-off of more than one of said lighting circuits at a time.

4. An apparatus according to claim 3 wherein said preventing means comprises delay means.

5. An apparatus according to claim 2 wherein said means for setting said second one of said bistable circuit means to its light-on condition comprises:

means for inverting said "light-on" signal;

first gate means responsive to the output of said inverting means and the setting of said first one of said bistable circuit means to its light-on condition for providing an output;

second gate means responsive to said output from said first gate means and said "light-on" signal; and means for coupling said second gate means to said second one of said bistable circuit means; and wherein said means for setting said second one of said bistable circuit means to its light-off condition comprises:

third gate means responsive to said "light-off" signal and the setting of said first one of said bistable circuit means to its light-off condition; and means for coupling said third gate means to said second one of said bistable circuit means.

6. An apparatus according to claim 5 comprising delay means for preventing the turning-on and turning-off of more than a predetermined number of said lighting circuits at one time.

7. An apparatus according to claim 6 wherein said delay means comprises delay means coupled to the output of said first and second gate means.

8. An apparatus according to claim 2 wherein said means for setting a second one of said bistable circuit means to its light-on condition comprises:

first delay means responsive to the setting of said first one of said bistable circuit means to its light-on condition for providing an output;

first gate means responsive to said "light-on" signal and said output; and means for coupling said first gate means to said second one of said bistable circuit means; and wherein said means for setting a first one of said bistable circuit means to its light-off condition comprises:

a second delay means responsive to the setting of said first one of said bistable circuit means to its light-off condition for providing an output;

second gate means responsive to said "light-off" signal and said output; and means for coupling said second gate means to said second one of said bistable circuit means.

9. An apparatus according to claim 8 wherein said first delay means comprises a delayed-on instant reset circuit means having a predetermined delay period and an output which does not change if its input is at its initial value at the end of said delay period.

10. An apparatus according to claim 2 wherein said means for setting said second one of said bistable circuit means to its light-on condition comprises:

a first delay means having a first predetermined delay responsive to said "light-on" signal for setting said second one of said bistable circuit means to its light-on condition; and wherein said means for setting said second one of said bistable circuit means to its light-off condition comprises:

a second delay means having a second predetermined delay responsive to said "light-off" signal for setting said second one of said bistable circuit means to its light-off condition.

11. An apparatus according to claim 10 wherein said first delay means comprises a delayed-on instant reset circuit means having a predetermined delay period and an output which does not change if its input is at its initial value at the end of said delay period.

* * * * *